(12) United States Patent
Yin et al.

(10) Patent No.: US 10,863,506 B2
(45) Date of Patent: *Dec. 8, 2020

(54) VIRTUAL MULTICARRIER DESIGN FOR ORTHOGONAL FREQUENCY DIVISION MULTIPLE ACCESS COMMUNICATIONS

(71) Applicant: Apple Inc., Cupertino, CA (US)

(72) Inventors: Hujun Yin, Saratoga, CA (US);
Rongzhen Yang, Shanghai (CN);
Xiaoshu Qian, Cupertino, CA (US);
Yang-Seok Choi, Portland, OR (US);
Sassan Ahmadi, Portland, OR (US);
Kamran Etemad, Potomac, MD (US)

(73) Assignee: Apple Inc., Cupertino, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 16/021,871

(22) Filed: Jun. 28, 2018

(65) Prior Publication Data

US 2018/0310314 A1 Oct. 25, 2018

Related U.S. Application Data

(63) Continuation of application No. 15/366,903, filed on Dec. 1, 2016, now Pat. No. 10,045,347, which is a continuation of application No. 14/563,956, filed on Dec. 8, 2014, now Pat. No. 9,548,879, which is a continuation of application No. 13/658,735, filed on Oct. 23, 2012, now Pat. No. 8,934,554, which is a continuation of application No. 12/242,755, filed on Sep. 30, 2008, now Pat. No. 8,295,373.

(51) Int. Cl.
*H04W 72/04* (2009.01)
*H04L 5/00* (2006.01)
*H04L 27/26* (2006.01)

(52) U.S. Cl.
CPC ........ *H04W 72/0453* (2013.01); *H04L 5/003* (2013.01); *H04L 5/0007* (2013.01); *H04L 5/0066* (2013.01); *H04L 27/2627* (2013.01); *H04L 27/2628* (2013.01); *H04W 72/04* (2013.01); *H04W 72/0406* (2013.01)

(58) Field of Classification Search
CPC .................................................. H04B 7/2603
See application file for complete search history.

(56) References Cited

U.S. PATENT DOCUMENTS

| | | | | |
|---|---|---|---|---|
| 4,989,221 A | * | 1/1991 | Qureshi | ............. H03H 17/0621 370/290 |
| 5,852,630 A | * | 12/1998 | Langberg | ............ H04L 27/2647 375/219 |
| 6,134,419 A | * | 10/2000 | Williams | ............... H04H 20/63 375/E7.002 |

(Continued)

OTHER PUBLICATIONS

Fu et al., "Sub-carrier Alignment for IEEE 80216m Multi-band Frame Structure," IEEE C802.16m-08/143, IEEE 802.16 Broadband Wireless Access Working Group, Mar. 10, 2008, pp. 1-7.

(Continued)

*Primary Examiner* — Adolf Dsouza
(74) *Attorney, Agent, or Firm* — Fish & Richardson P.C.

(57) ABSTRACT

Embodiments of the present invention provide a virtual multicarrier design for orthogonal frequency division multiple access communications. Other embodiments may be described and claimed.

17 Claims, 9 Drawing Sheets

(56) References Cited

U.S. PATENT DOCUMENTS

| | | | |
|---|---|---|---|
| 6,216,250 B1* | 4/2001 | Williams | H04H 20/74 375/E7.002 |
| 7,756,208 B2* | 7/2010 | Bykovnikov | H04L 5/023 375/259 |
| 7,940,723 B2 | 5/2011 | Ahmadi | |
| 8,165,046 B2* | 4/2012 | Stanwood | H04B 7/2615 370/280 |
| 8,295,373 B2 | 10/2012 | Yin et al. | |
| 8,934,554 B2 | 1/2015 | Yin et al. | |
| 9,509,464 B2* | 11/2016 | Cai | H04L 5/0044 |
| 9,548,879 B2 | 1/2017 | Yin et al. | |
| 10,045,347 B2 | 8/2018 | Yin et al. | |
| 2003/0123383 A1* | 7/2003 | Korobkov | H04L 5/0037 370/208 |
| 2003/0204542 A1* | 10/2003 | Mueller | G06F 7/68 708/290 |
| 2003/0210645 A1* | 11/2003 | Gummadi | H04L 27/2657 370/203 |
| 2004/0125740 A1* | 7/2004 | Gardner | H04B 1/69 370/208 |
| 2005/0169395 A1* | 8/2005 | Monta | H04L 27/2628 375/261 |
| 2005/0220201 A1* | 10/2005 | Laroia | H04L 27/2607 375/260 |
| 2006/0109919 A1* | 5/2006 | Nieto | H04L 25/0232 375/260 |
| 2006/0115012 A1* | 6/2006 | Sadowsky | H04L 27/2602 375/260 |
| 2006/0146949 A1* | 7/2006 | Bykovnikov | H04L 5/023 375/260 |
| 2007/0019717 A1* | 1/2007 | Laroia | H04L 1/0004 375/222 |
| 2007/0104280 A1* | 5/2007 | Ibrahim | H04L 25/0228 375/260 |
| 2007/0142048 A1* | 6/2007 | Anigstein | H04W 36/06 455/435.2 |
| 2008/0039107 A1* | 2/2008 | Ma | H04B 7/02 455/450 |
| 2008/0089282 A1* | 4/2008 | Malladi | H04J 11/0069 370/329 |
| 2008/0095108 A1* | 4/2008 | Malladi | H04B 1/713 370/329 |
| 2008/0159323 A1* | 7/2008 | Rinne | H04L 1/0004 370/431 |
| 2008/0165743 A1* | 7/2008 | Palanki | H04L 27/0008 370/335 |
| 2008/0186931 A1* | 8/2008 | Prakash | H04W 28/24 370/338 |
| 2008/0205549 A1* | 8/2008 | Rofougaran | H04L 27/3405 375/299 |
| 2008/0219371 A1* | 9/2008 | Hong | H04L 25/022 375/260 |
| 2008/0227481 A1* | 9/2008 | Naguib | H04L 5/0044 455/550.1 |
| 2008/0240275 A1* | 10/2008 | Cai | H04L 5/0007 375/260 |
| 2008/0298490 A1* | 12/2008 | Yun | H04L 27/2618 375/260 |
| 2008/0311939 A1* | 12/2008 | Hugl | H04B 7/0417 455/507 |
| 2009/0022098 A1* | 1/2009 | Novak | H04L 1/14 370/329 |
| 2009/0047971 A1* | 2/2009 | Fu | H04W 72/082 455/450 |
| 2009/0074047 A1* | 3/2009 | Yang | H04L 1/20 375/227 |
| 2009/0074094 A1* | 3/2009 | Palanki | H04L 27/10 375/260 |
| 2009/0075664 A1* | 3/2009 | Palanki | H04L 5/0044 455/446 |
| 2009/0103562 A1* | 4/2009 | Frederiksen | H04W 28/18 370/468 |
| 2009/0135752 A1* | 5/2009 | Su | H04W 52/029 370/311 |
| 2009/0135803 A1* | 5/2009 | Luo | H04L 5/0007 370/350 |
| 2009/0190682 A1* | 7/2009 | Ouyang | H04L 1/06 375/262 |
| 2009/0202010 A1* | 8/2009 | Fu | H04L 25/03159 375/260 |
| 2009/0307484 A1* | 12/2009 | Zhang | H04W 12/02 713/153 |
| 2010/0002571 A1* | 1/2010 | Liao | H04L 27/2647 370/208 |
| 2010/0029262 A1* | 2/2010 | Wang | H04J 11/004 455/423 |
| 2010/0061223 A1* | 3/2010 | Kim | H04L 5/0044 370/208 |
| 2010/0080308 A1 | 4/2010 | Yin et al. | |
| 2011/0103406 A1* | 5/2011 | Cai | H04L 5/0044 370/480 |
| 2013/0114527 A1 | 5/2013 | Yin et al. | |
| 2015/0172085 A1 | 6/2015 | Yin et al. | |
| 2017/0086198 A1 | 3/2017 | Yin et al. | |

OTHER PUBLICATIONS

Hongyun et al., "Further Considerations on IEEE 802.16m OFDMA numerology," IEEE C802.16m-08/236r3, IEEE 802.16 Broadband Wireless Access Working Group, Mar. 19, 2008, pp. 1-22.

Roh et al., "Proposed 802.16m DL Control Channel Scheme to Use More Subcarriers in Guard Band," IEEE C802-16m-08/208r2, IEEE 802.16 Broadband Wireless Access Working Group, Mar. 14, 2008, pp. 1-4.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3rd Generation Partnership Project (3GPP™), Release 8, Valbonne, France, 3GPP TS 36.300 V8.1.0; Jun. 2007, pp. 1-106.

"Introduction to OFDM," E225C—Lecture 16, EE225C, Apr. 7, 2003, pp. 1-15, University of Berkeley, California, website: http://bwrcs.eecs.berkeley.edu/Classes/EE225C/Lectures/Lec16_ofdm.pdf.

3GPP, "Technical Specification Group Radio Access Network; Evolved Universal Terrestrial Radio Access (E-UTRA); LTE Physical Layer—General Description (Release 8)," 3GPP TS 36.201 V8.1.0 (Nov. 2007), Dec. 11, 2007, 13 pages.

3GPP, "Technical Specification Group Radio Access Network; Evolved Universal Terrestrial Radio Access (E-UTRA); Base Station (BS) radio transmission and reception (Release 8)," 3GPP TS 36.104 V8.3.0 (Sep. 2008), Sep. 23, 2008, 68 pages.

United States Patent Office—Office Action dated Sep. 29, 2017 from U.S. Appl. No. 15/366,903, 20 pages.

United States Patent Office—Notice of Allowance dated Apr. 24, 2018 from U.S. Appl. No. 15/366,903, 7 pages.

* cited by examiner

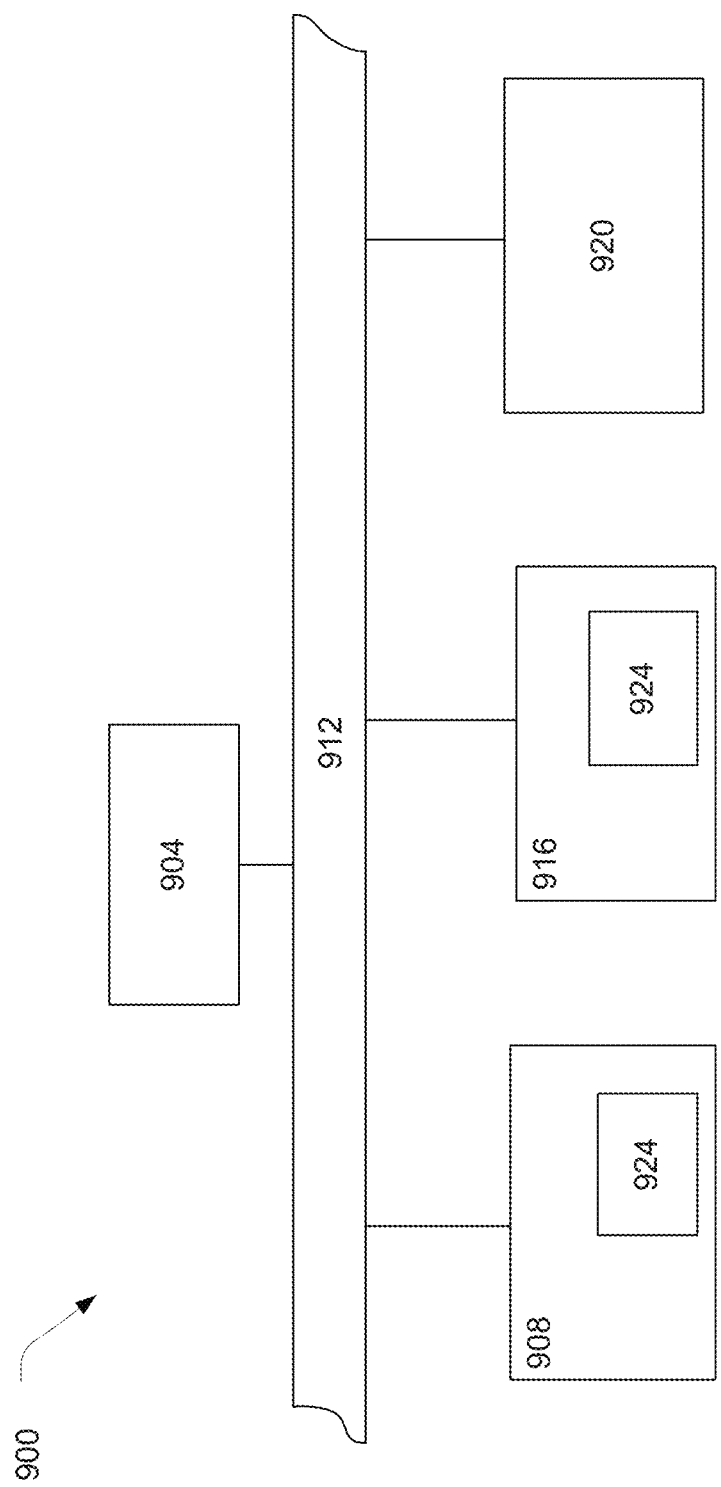

VIRTUAL MULTICARRIER DESIGN FOR ORTHOGONAL FREQUENCY DIVISION MULTIPLE ACCESS COMMUNICATIONS

CROSS REFERENCE TO RELATED APPLICATIONS

The present application is a continuation of U.S. patent application Ser. No. 15/366,903, filed Dec. 6, 2016, entitled, "VIRTUAL MULTICARRIER DESIGN FOR ORTHOGONAL FREQUENCY DIVISION MULTIPLE ACCESS COMMUNICATIONS," which is a continuation of U.S. patent application Ser. No. 14/563,956, filed Dec. 8, 2014, entitled, "VIRTUAL MULTICARRIER DESIGN FOR ORTHOGONAL FREQUENCY DIVISION MULTIPLE ACCESS COMMUNICATIONS," which is a continuation of U.S. patent application Ser. No. 13/658,735, filed Oct. 23, 2012, entitled, "VIRTUAL MULTICARRIER DESIGN FOR ORTHOGONAL FREQUENCY DIVISION MULTIPLE ACCESS COMMUNICATIONS," which is a continuation of U.S. patent application Ser. No. 12/242,755 filed Sep. 30, 2008, entitled, "VIRTUAL MULTICARRIER DESIGN FOR ORTHOGONAL FREQUENCY DIVISION MULTIPLE ACCESS COMMUNICATIONS," the entire specification of which is hereby incorporated by reference in its entirety for all purposes.

FIELD

Embodiments of the present disclosure relate to the field of wireless access networks, and more particularly, to virtual multicarrier design for orthogonal frequency division multiple access communications in said wireless access networks.

BACKGROUND

Orthogonal frequency division multiple access (OFDMA) communications use an orthogonal frequency-division multiplexing (OFDM) digital modulation scheme to deliver information across broadband networks. OFDMA is particularly suitable for delivering information across wireless networks.

The OFDM digital modulation scheme uses a large number of closely-spaced orthogonal subcarriers to carry information. Each subcarrier is capable of carrying a data stream across a network between OFDMA terminals.

OFDMA-based communication systems are well known to have out of band emission (OOBE) issues that result in intercarrier interference (ICI). Prior art networks control this ICI by providing guard bands, e.g., unused subcarriers, between adjacent carriers.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 9 illustrates a computing device capable of implementing a virtual carrier terminal in accordance with some embodiments.

DETAILED DESCRIPTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of the present invention, the phrase "A and/or B" means "(A), (B), or (A and B)." For the purposes of the present invention, the phrase "A, B, and/or C" means "(A), (B), (C), (A and B), (A and C), (B and C), or (A, B and C)."

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Embodiments of the present disclosure describe virtual multicarrier designs for OFDMA communications as may be used by multicarrier transmission schemes presented in, e.g., the Institute of Electrical and Electronics Engineers (IEEE) 802.16-2004 standard along with any amendments, updates, and/or revisions (e.g., 802.16m, which is presently at pre-draft stage), $3^{rd}$ Generation Partnership Project (3GPP) long-term evolution (LTE) project, ultra mobile broadband (UMB) project (also referred to as "3GPP2"), etc.

Figure 1:
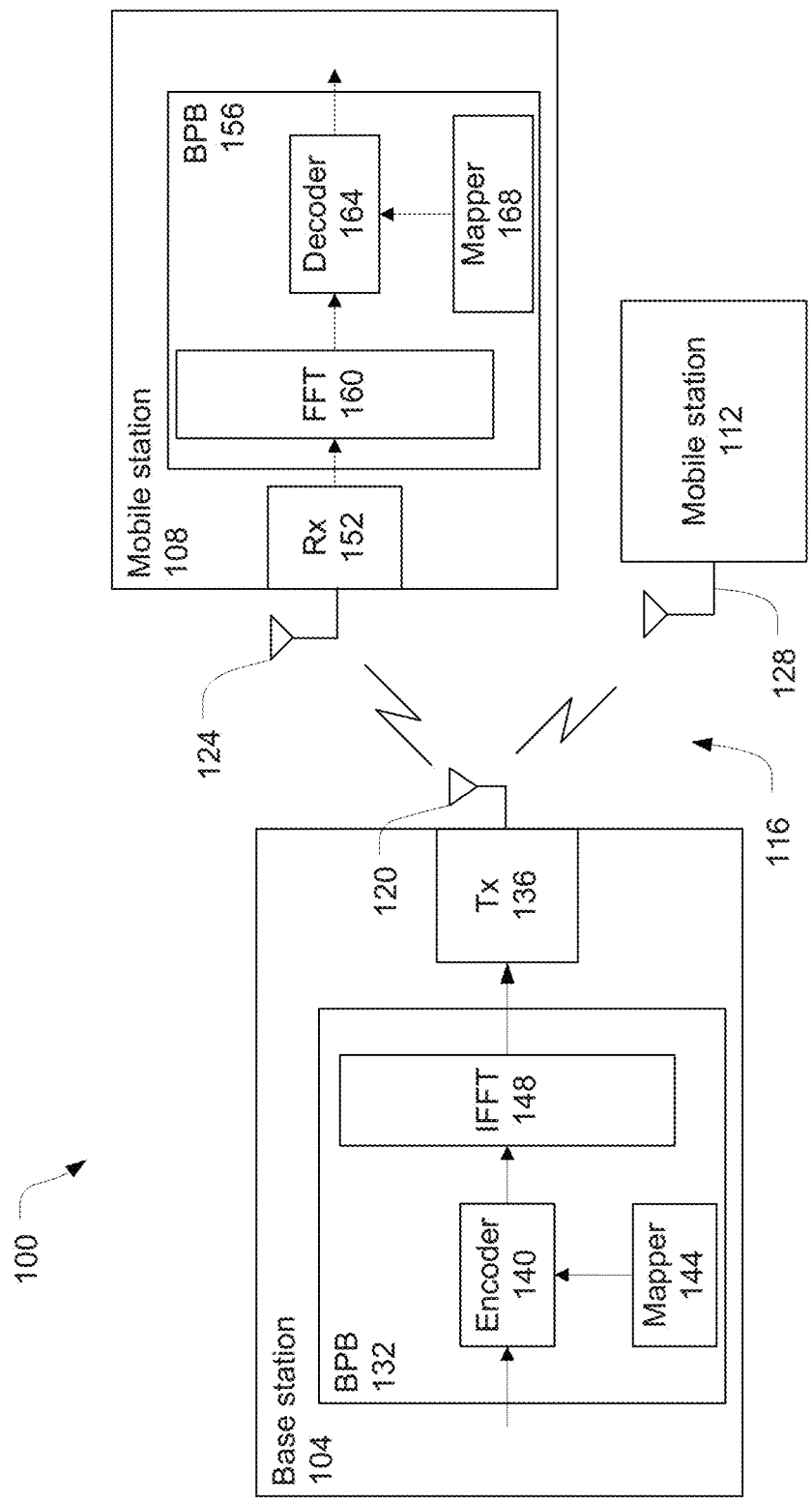
FIG. 1 illustrates a wireless communication environment in accordance with embodiments of this disclosure.

FIG. 1 illustrates a wireless communication environment 100 in accordance with an embodiment of this disclosure. In this embodiment, the wireless communication environment 100 is shown with three wireless communication terminals, e.g., base station 104, mobile station 108, and mobile station 112, communicatively coupled to one another via an over-the-air (OTA) interface 116.

In various embodiments, the mobile stations 108 and 112 may be a mobile computer, a personal digital assistant, a mobile phone, etc. The base station 104 may be a fixed device or a mobile device that may provide the mobile stations 108 and 112 with network access. The base station 104 may be an access point, a base transceiver station, a radio base station, a node B, etc.

The wireless communication devices 104, 108, and 112 may have respective antenna structures 120, 124, and 128 to facilitate the communicative coupling. Each of the antenna structures 120, 124, and 128 may have one or more antennas. An antenna may be a directional or an omnidirectional antenna, including, e.g., a dipole antenna, a monopole antenna, a patch antenna, a loop antenna, a microstrip antenna or any other type of antenna suitable for transmission/reception of radio frequency (RF) signals.

Briefly, the base station 104 may have a baseband processing block (BPB) 132 coupled to a transmitter 136. The BPB 132 may be configured to encode input data, which may be received in a binary format, as an OFDM signal on logical subcarriers of a virtual carrier. The logical subcarriers may be mapped to physical subcarriers from at least two adjacent physical carriers. The BPB 132 may then control the transmitter 136 to transmit the OFDM signal on the physical subcarriers.

Figure 2:
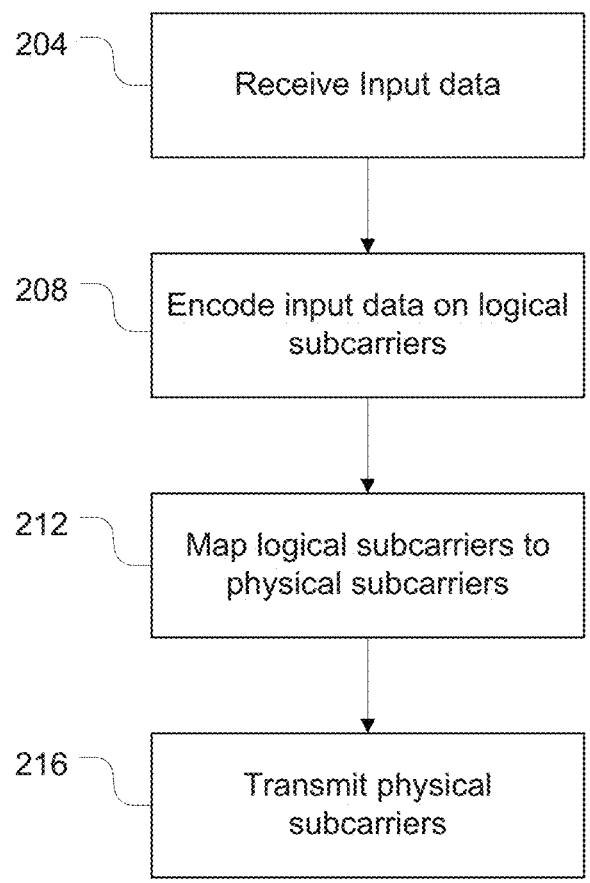
FIG. 2 is a flowchart depicting operations of a base station in accordance with some embodiments.

FIG. 2 is a flowchart depicting operations of the base station 104 in accordance with some embodiments. At block 204, an encoder 140 of the BPB 132 may receive input data from upper layers of the base station 104.

At block 208, the encoder 140 may encode the input data into frequency domain OFDM signal having logical subcarriers of a virtual carrier.

At block 212, the encoder 140 may map the logical subcarriers to physical subcarriers of one or more physical carriers according to a mapping scheme provided by the mapper 144.

In some embodiments, the mapping scheme may map indices of the logical subcarriers to indices of the physical subcarriers. For example, consider a simple embodiment in which the encoder 140 encodes an OFDMA signal onto 20 logical subcarriers of a virtual carrier. The logical subcarriers may have indices 1-20. A mapping scheme may map the logical subcarrier indices 1-20 to physical subcarrier indices 1-5 of a first physical carrier, physical subcarrier indices 1-5 of a second physical carrier, and physical subcarrier indices 1-10 of a third physical carrier. In an actual implementation, the number of subcarriers will be significantly higher. Furthermore, the total number of logical subcarriers need not be equal to the total number of physical subcarriers as is described in this example.

The frequency domain OFDM signal may be provided to an inverse fast Fourier transformer (IFFT) 148 that transforms the signal into a time domain OFDM signal, having a plurality of time domain samples for associated physical subcarriers.

At block 216, the transmitter 136 may be controlled to transmit the physical subcarriers. The transmitter 136 may provide a variety of physical layer processing techniques, e.g., adding cyclic prefix, upconverting, parallel-to-serial conversion, digital-to-analog conversion, etc. to effectuate the transmission.

The receiving process of the mobile stations may operate in a manner that complements the transmitting process described above.

Figure 3:
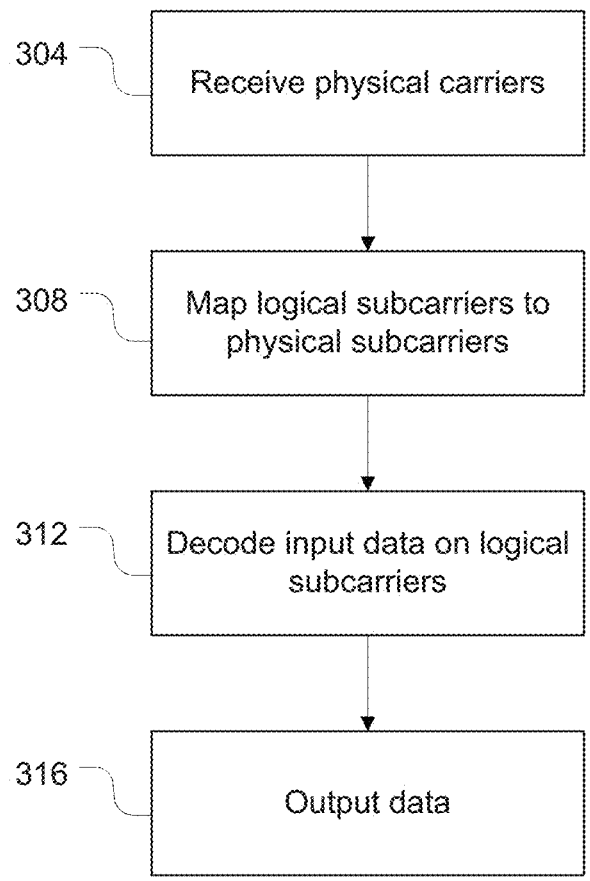
FIG. 3 is a flowchart depicting operations of a mobile station in accordance with some embodiments.

FIG. 3 is a flowchart depicting operations of the mobile station 108 in accordance with some embodiments. At block 304, a receiver 152 of the mobile station 108 may receive the physical carriers that carry the OFDM signal via the OTA interface 116, process the OFDM signal and present it, as a time domain OFDM signal, to a BPB 156. The complementary physical layer processing techniques of the receiver 152 may include, e.g., removing cyclic prefix, down converting, serial-to-parallel conversion, analog-to-digital conversion, etc. to effectuate reception and facilitate subsequent processing.

The BPB 156 may include a fast Fourier transformer (FFT) 160 to receive the time domain OFDM signal from the receiver 152. The FFT 160 may generate a frequency domain OFDM signal and forward the signal to a decoder 164.

At block 308, the decoder 164 may map the physical subcarriers of the physical carriers to logical subcarriers of the virtual carrier according to the mapping scheme provided by mapper 168. In some embodiments, information related to the mapping scheme may be transmitted to the mobile station 108 from the base station 104 in, e.g., downlink (DL) control messages, DL broadcast channel messages, etc.

At block 312, the decoder 164 may decode the logical subcarriers to retrieve the transmitted data. This data may then be output to upper layers of the mobile station 108 at block 316.

The use of virtual multicarriers for communications between terminals may, for example, allow a base station to scale its bandwidth, provide support for mobile stations having various bandwidths, facilitate deployment and upgrading of network equipment due, at least in part, to legacy support, etc. These aspects will be discussed in further detail below.

While the described embodiments discuss the base station 104 transmitting, and the mobile station 108 receiving, on virtual carriers, other embodiments may additionally/alternatively include the mobile station 108 transmitting, and the base station 104 receiving, on virtual channels.

Furthermore, various embodiments of this disclosure describe aligning subcarriers of adjacent physical carriers of a virtual carrier. As used herein, subcarrier of adjacent physical carriers may be aligned if the spacing between a subcarrier of a first physical carrier and a subcarrier of a second physical carrier is equal to, or a multiple of, a spacing between adjacent subcarriers within the first (or second) physical carrier. This alignment may reduce, either in part or in total, ISI, which may, in turn, enable use of subcarriers traditional reserved for guard band. Using these subcarriers for data transmission may increase an overall spectrum utilization ratio.

To understand the effect of subcarrier spacing between adjacent carriers, consider an OFDM signal that is expressed in the time domain as:

$$y(t) = \sum_{k=0}^{M-1} X(k)e^{j2\pi q_k \Delta f t}, 0 \le t \le T_u, \quad \text{Eq. 1}$$

$$T_u \Delta f = 1, q_k: \text{int} \in \left[-\frac{N}{2}, \frac{N}{2} - 1\right]$$

and in the frequency domain as:

$$Y(f) = T_u \sum_{k=0}^{M-1} X(k)\text{Sinc}((f - q_k \Delta f)T_u)e^{-j\pi(f - q_k \Delta f)T_u} \quad \text{Eq. 2}$$

where M is the number of used subcarriers, $T_u$ is useful symbol duration, $q_k$ is the position, or index, of the used subcarrier. Eq. 2 may be used to calculate the average power spectrum as:

$$E\{|Y(f)|^2\} = \sigma_s^2 \sum_{k=0}^{M-1} |\text{Sinc}((f - q_k \Delta f)T_u|^2 \qquad \text{Eq. 3}$$

$$= \sigma_s^2 |\sin(\beta \pi)|^2 \sum_{k=0}^{M-1} \frac{1}{|\pi(f - q_k \Delta f)T_u|^2}, \qquad \text{Eq. 4}$$

where $\beta$ is a misalignment factor that ranges from 0~1, and $\sigma_s$ is an expression of subcarrier energy.

Figure 4:
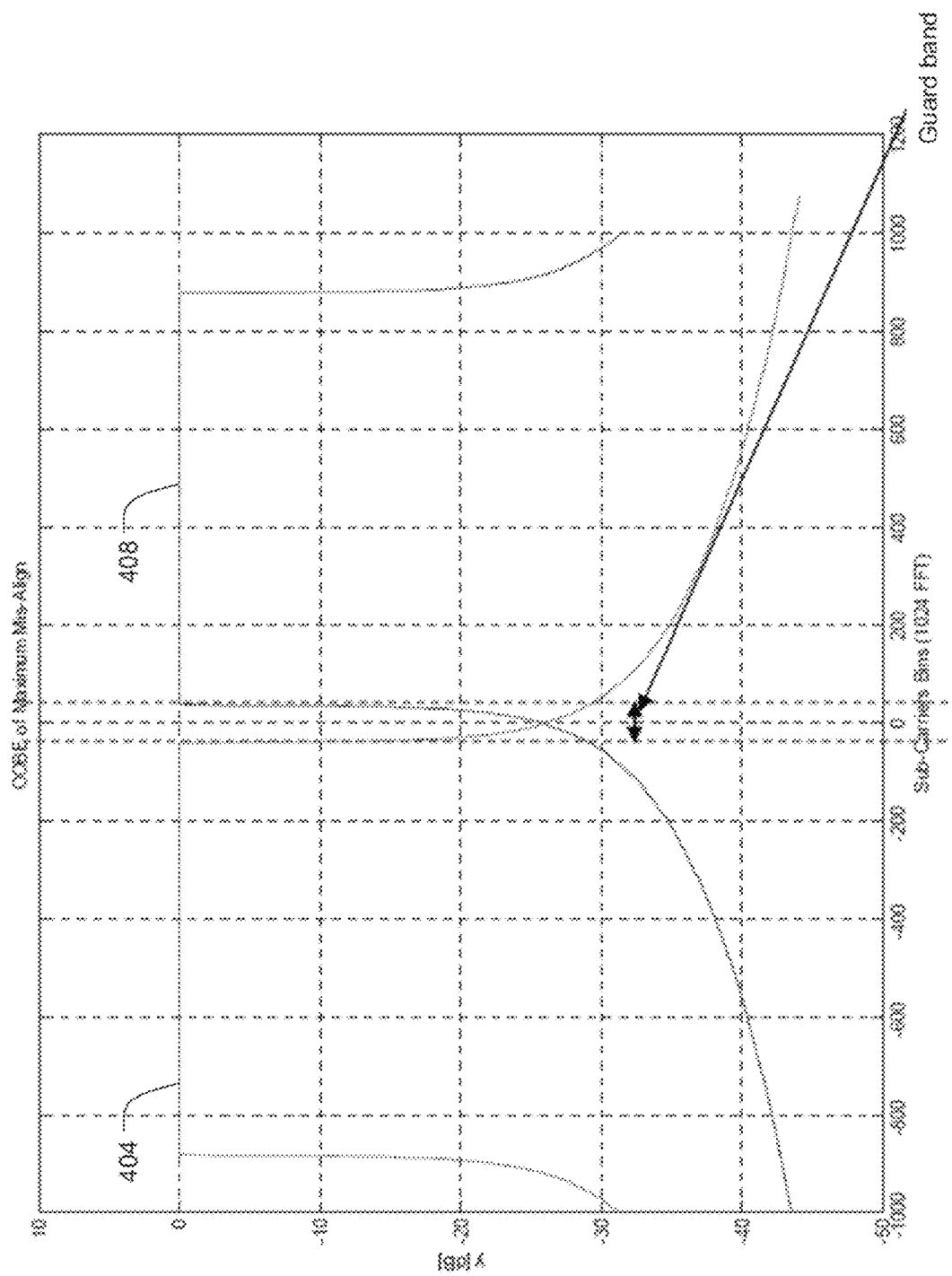
FIG. 4 is a graph illustrating OOBE on two adjacent carriers in accordance with some embodiments.

FIG. 4 is a graph illustrating OOBE on two adjacent carriers 404 and 408 that have a maximum misalignment factor of 0.5, a 10 MHz bandwidth, 840 subcarriers, and no low-pass filter. As can be seen, there is a 0 to −29 dB interference signal at guard band subcarriers.

The power of the interference signal from a neighboring carrier may be:

$$10\log\left(\sigma_s^2 \sum_{k=0}^{M-1} \frac{1}{|\pi(f - q_k \Delta f)T_u|^2}\right) + 10\log(|\sin(\beta \pi)|^2). \qquad \text{Eq. 5}$$

When the subcarriers of adjacent carriers are aligned, as described in accordance with various embodiments, the alignment factor $\beta=0$ and the value of the expression "10 log($|\sin(\beta \pi)|^2$)" of Eq. 5 will go to negative infinity. Accordingly, there will be no (or very little) interference due to OOBE after the neighboring carriers are well aligned.

The alignment of the subcarriers in adjacent carriers may be accomplished in a variety of ways. In one embodiment, the IFFT 148 may be one transformer that utilizes all of the frequency domain samples corresponding to one virtual channel as one vector input group. In this manner, the subcarriers across an entire virtual carrier of, e.g., a 20 MHz band, may then be equally spaced. The 20 MHz band may be subdivided into various physical carriers, e.g., two 5 MHz and one 10 MHz carriers.

In another embodiment, the IFFT 148 may include more than one transformer, e.g., it may include a transformer for each physical carrier, with each transformer producing a physical carrier. In this embodiment, each of the distinct transformers may perform transform functions on distinct vector input groups of the frequency domain samples. When separate transformers are used to independently produce physical carriers, care may be taken to ensure that subcarriers of adjacent carriers are aligned. In various embodiments, subcarrier alignment may be performed by changing the channel raster to, e.g., 175 kHz; by shifting the center frequency of adjacent carriers; and/or to change the subcarrier spacing to, e.g., 12.5 kHz.

Figure 5:
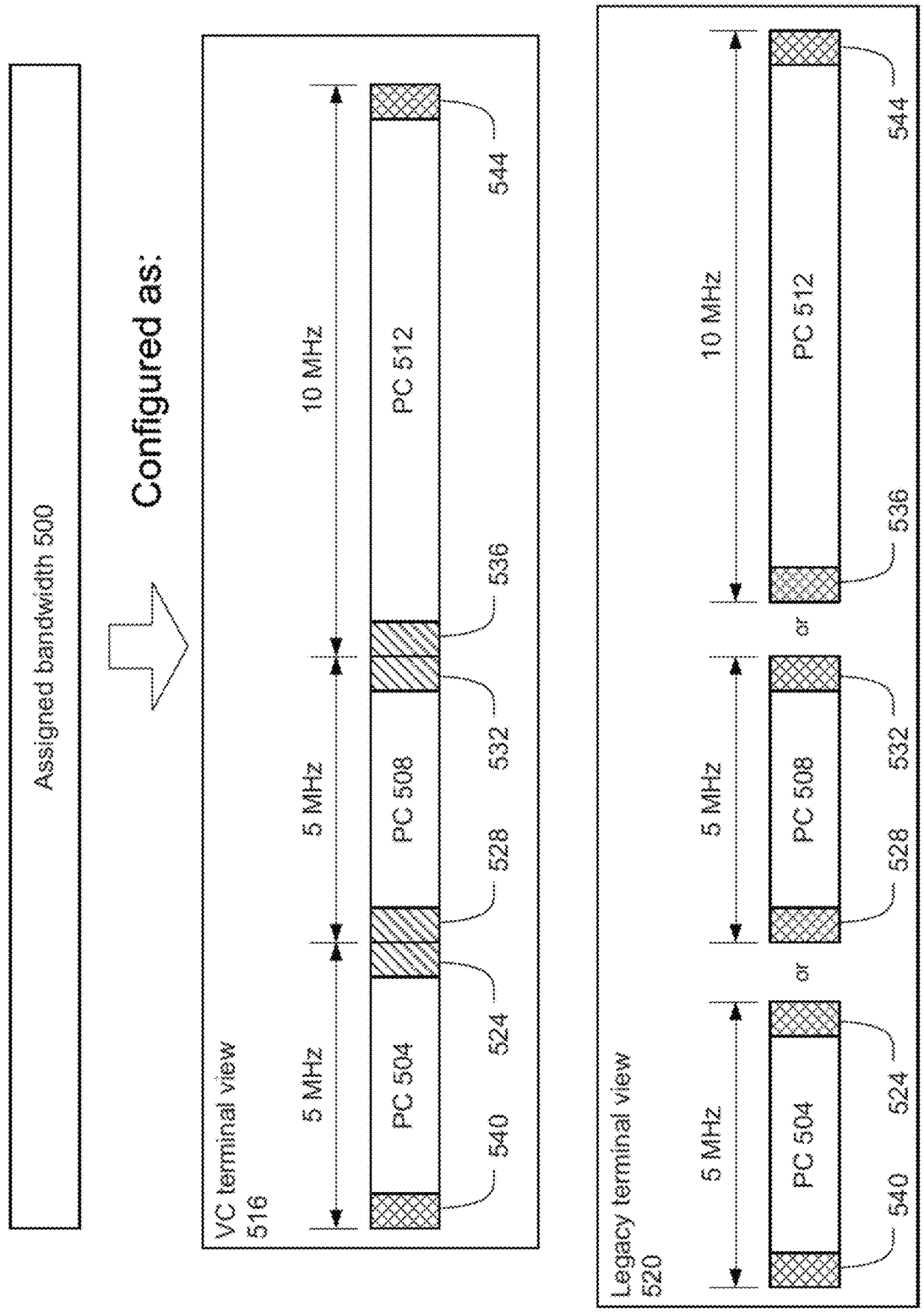
FIG. 5 illustrates various views of a configuration of assigned bandwidth in accordance with some embodiments.

FIG. 5 illustrates various views of a configuration of assigned bandwidth 500 in accordance with embodiments of this disclosure. In this embodiment, the assigned bandwidth 500 may be a 20 MHz band. The base station 104 may configure the assigned bandwidth 500 as three physical carriers, e.g., physical carrier (PC) 504, PC 508, and PC 512. PCs 504 and 508 may be 5 MHz bands, while the PC 512 may be a 10 MHz band. A "physical carrier," as used herein, may refer to a continuous spectrum of radio frequencies in which at least one mobile station of the wireless communication environment 100 is capable of, and restricted to, communicating with the base station.

The configured PCs may be viewed differently according to the capabilities of the receiving terminal. A terminal capable of communicating with virtual carriers (hereinafter also referred to as "VC terminal") may have a VC terminal view 516, while a terminal not able to communicate with virtual carriers (hereinafter also referred to as "legacy terminal") may have a legacy terminal view 520. The base station 104 may adapt communications accordingly.

The base station 104 may communicate with a VC terminal having a 20 MHz receiver by a virtual carrier shown in the VC terminal view 516. With the subcarriers of adjacent PCs being aligned, e.g., PC 504 and 508 and/or PC 508 and PC 512, the base station 104 may utilize at least some of the edge subcarrier groups, which are reserved as guard band subcarriers in prior art systems, for communication. As used herein, "an edge subcarrier group" may be a group of consecutive subcarriers of a particular PC that includes a subcarrier that is adjacent to subcarriers of an adjacent PC.

Edge subcarrier groups that are adjacent to a PC of a common virtual carrier may be referred to as interior edge subcarrier groups. In FIG. 5, the interior edge subcarrier groups may be groups 524, 528, 532, and 536. Given the subcarrier alignment, these interior edge subcarrier groups may be utilized for communications. However, in order to avoid ICI with PCs external to the virtual carrier, the groups 540 and 544, or external edge subcarrier groups, may be reserved for a guard band.

The base station 104 may communicate with legacy terminal by PC 504, 508, or 512 as seen in the legacy terminal view 520. Each legacy terminal will only be capable of receiving data communications on one of the PCs. Furthermore, unlike the VC terminals, a legacy terminal will see the edge subcarrier groups 524, 528, 532, and 536 as being reserved for a guard band. Accordingly, the legacy terminal will not be able to transmit or receive on subcarriers within these groups.

Communications between the base station 104 and a legacy terminal will not compromise a contemporaneous communication of the base station 104 and a VC terminal that uses the full range of available subcarriers.

Figure 6:
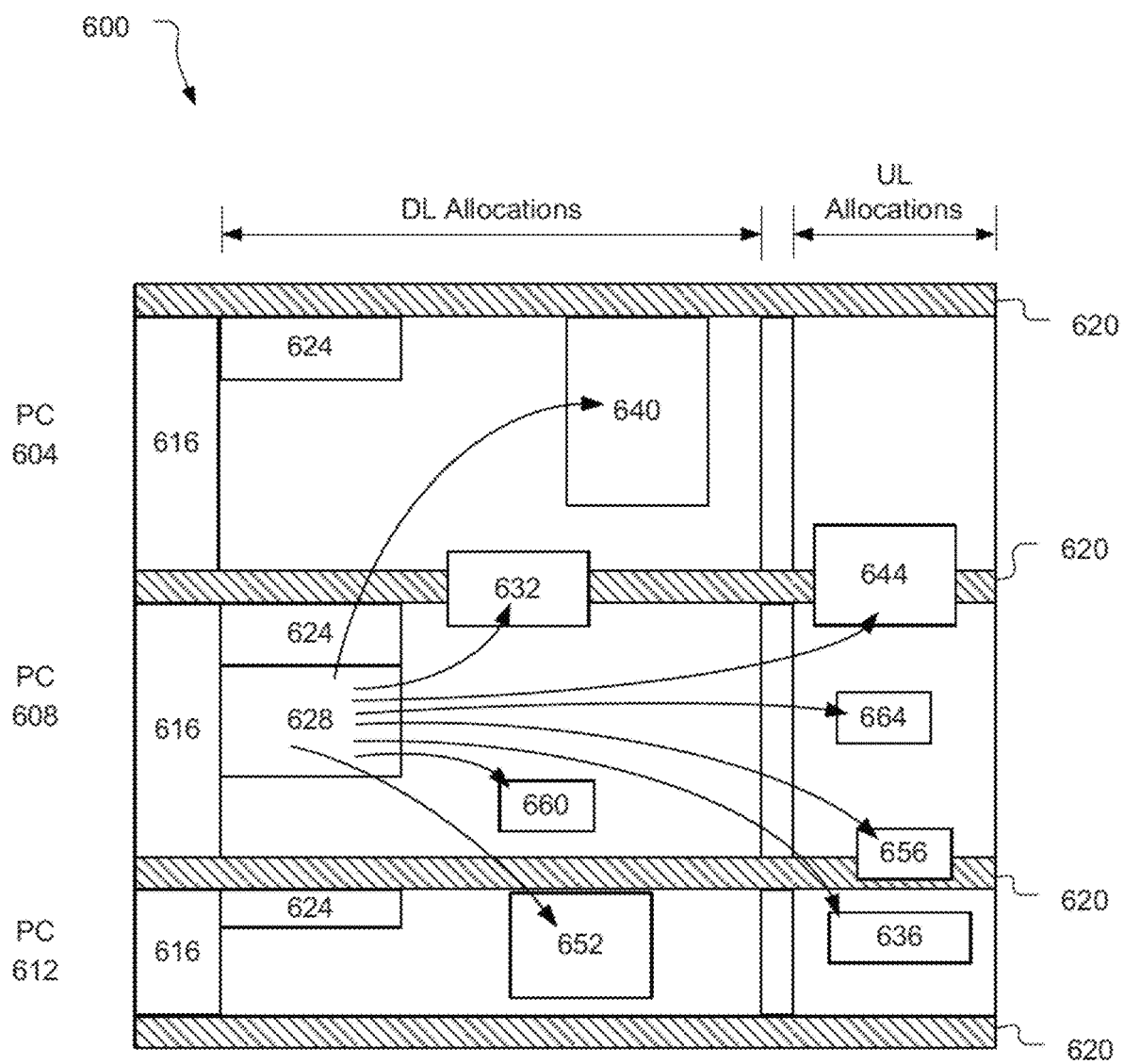
FIG. 6 illustrates an OFDMA frame in accordance with some embodiments.

FIG. 6 illustrates an OFDM frame 600 in accordance with embodiments of the present disclosure. In this embodiment, PCs 604, 608, and 612 are shown. PCs 604 and 608 may each have, e.g., a 10 MHz band, while PC 612 may have a 5 MHz band. Each PC may include a preamble 616, edge subcarriers 620, and a broadcast messaging section 624.

In one embodiment, the base station 104 may encode data onto a first virtual carrier (VC1) that includes all three of the PCs 604, 608, and 612. In this embodiment, one or more receiving terminals including, e.g., mobile station 108, may have a 25 MHz receiver that accommodates the entire range of VC1.

The base station 104 may transmit allocation information on a common messaging section 628 to communicate DL and UL allocations to VC terminals. In this embodiment, the base station 104 may use the common messaging section 628 to inform the mobile station 108 that downlink communications will be sent to the mobile station 108 at resource 632 and that the mobile station 108 may upload information to the base station 104 at resource 636. As can be seen, the resource 632 may incorporate edge subcarriers of PCs 604 and 608.

The base station 104 may also encode data onto other virtual carriers that include various subsets of adjacent PCs. For example, the base station 104 may encode data onto a second virtual carrier (VC2) that includes only PC 604 and PC 608. VC2 may be used for communications with VC terminals having 20 MHz receivers. Hereinafter, a VC terminal having a 20 MHz receiver may also be referred to as a 20 MHz VC terminal. In this embodiment, the base station 104 may communicate, to a particular 20 MHz VC terminal, DL allocations at resource 640 and UL allocations at resource 644, which also includes edge subcarrier groups of PC 604 and PC 608.

The base station 104 may additionally/alternatively encode data onto a third virtual carrier (VC1) that includes only PC 608 and PC 612. VC3 may be used for communications with 15 MHz VC terminals. In this embodiment, the base station 104 may communicate, to a particular 15 MHz VC terminal, DL allocations at resource 652 and UL allocations at resource 656, which may include edge subcarrier groups of PC 608 and PC 612.

The base station 104 may also use individual PCs to communicate with legacy terminals. In this embodiment, e.g., 10 MHz legacy terminals may communicate with the base station 104 on PC 608. The base station 104 may communicate, to a particular 10 MHz legacy terminal, DL allocations at resource 660 and UL allocations at resource 664. It may be noted that communications between the base station 104 and the legacy terminal may not use the edge subcarrier groups of the PC 608. However, these same edge subcarrier groups of PC 608 may be used for communications between the base station 104 and VC terminals without adversely affecting the communications with the legacy terminal.

Dividing an assigned bandwidth into various PCs, which may or may not have the same bandwidths, and utilizing the different PCs in various combinations to provide a variety of virtual carriers, may allow base stations endowed with teachings of this disclosure to scale communications to terminals configured to operate on any number of different bandwidths.

In some embodiments, one or more of the PCs of a virtual carrier may be used as a data only pipe. For example, in VC1 control and signaling information may be transmitted in PC 608 while the entire spectrum of PC 612 is reserved for data communications. However, if a PC is being used to communicate with a legacy terminal, some amount of control and signaling information may be desired in said PC.

Figure 7:
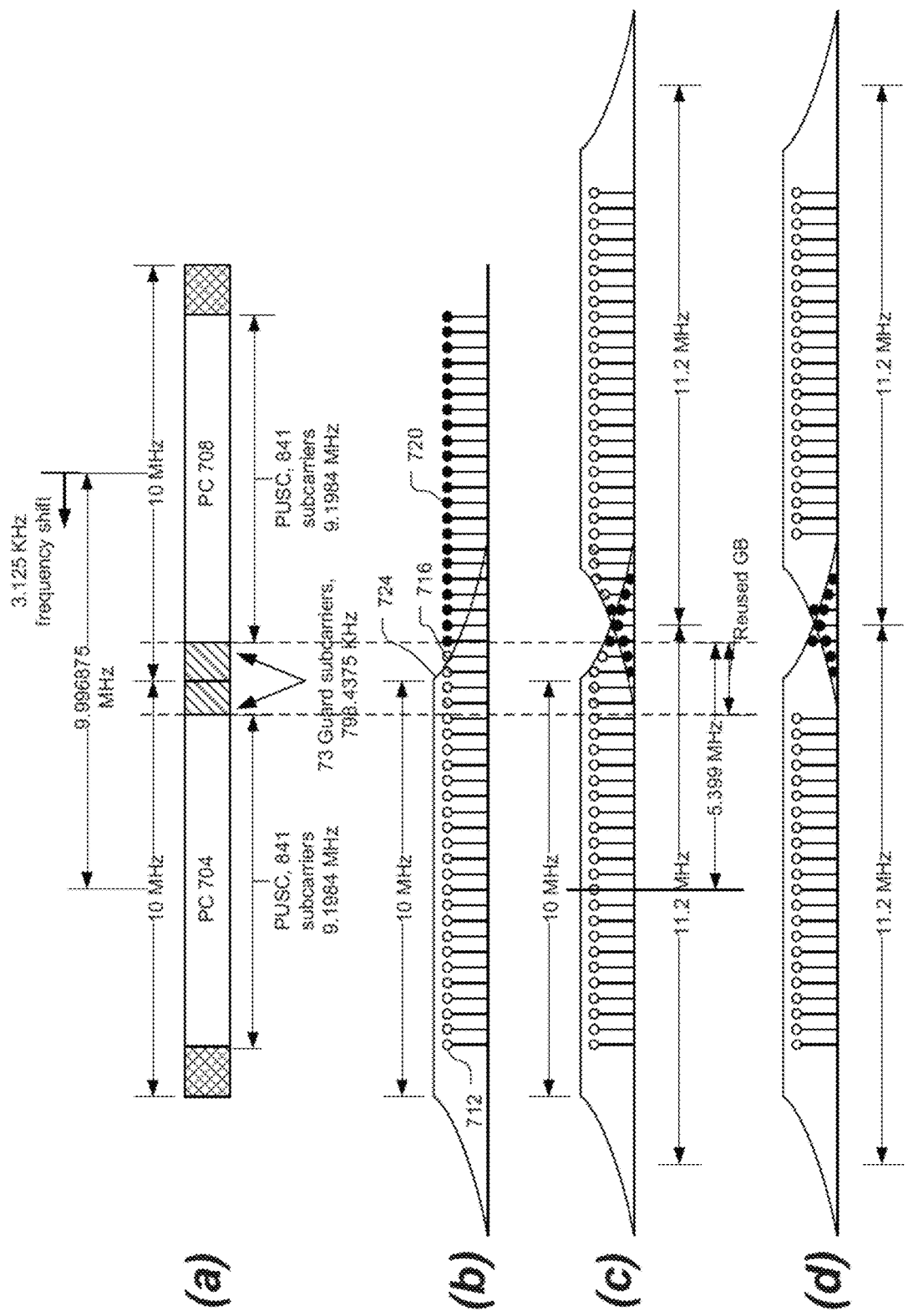
FIG. 7 illustrates a multicarrier transmission being processed with and without reuse of guard band subcarriers in accordance with some embodiments.

FIG. 7 illustrates a multicarrier transmission being processed with and without reuse of edge subcarriers in accordance with an embodiment of the present disclosure. Referring to FIG. 7(a), a virtual carrier, including PCs 704 and 708, may be used for transmissions to a VC terminal and PC 704 may be used for transmissions to a legacy terminal. Each of the PCs 704 and 708 may have 10 MHz bands. Data may be distributed among the PCs according to a partial usage subchannelization (PUSC) scheme with each PC having 841 subcarriers (not including edge carrier groups) over a 9.1984 MHz band.

In order to align the two PCs, the center frequency of PC 708 may be shifted by 3.125 KHz, which may result in the center frequencies of the two bands being 9.996875 MHz apart. The value of this frequency shift is purely exemplary and may be adjusted in various embodiments according to, e.g., carrier bandwidth, subcarrier spacing, etc.

FIG. 7(b) illustrates subcarriers 712 that represent the 841 subcarriers of the PC 704, subcarriers 716 that represent the 73 guard subcarriers, and subcarriers 720 that correspond to the 841 subcarriers of the PC 708. The legacy terminal may include a 10 MHz band selection filter 724 that corresponds to the PC 704.

FIG. 7(c) illustrates data tones that may result from the sampling of the subcarriers of FIG. 7(b) when all of the subcarriers, including the subcarriers 716, are used for data transmission in accordance with an embodiment of the present disclosure. In this embodiment, a common sampling rate of 11.2 MHz for a 10 MHz carrier is used.

FIG. 7(d) illustrates data tones that may result from the sampling of the subcarriers of FIG. 7(b) when the subcarriers 716 are not used for data transmission in accordance with an embodiment of the present disclosure.

As can be seen by FIGS. 7(c) and 7(d), the values of the subcarriers that are used by the legacy terminal, e.g., subcarriers 712, are not impacted regardless of whether or not the guard band subcarriers 716 are used.

Therefore, data transmissions to a legacy terminal will not be affected, even when the guard subcarriers of the PC 708 are used and the PC 708 is effectively shifted closer to the PC 704 due to the alignment processing.

Figure 8:
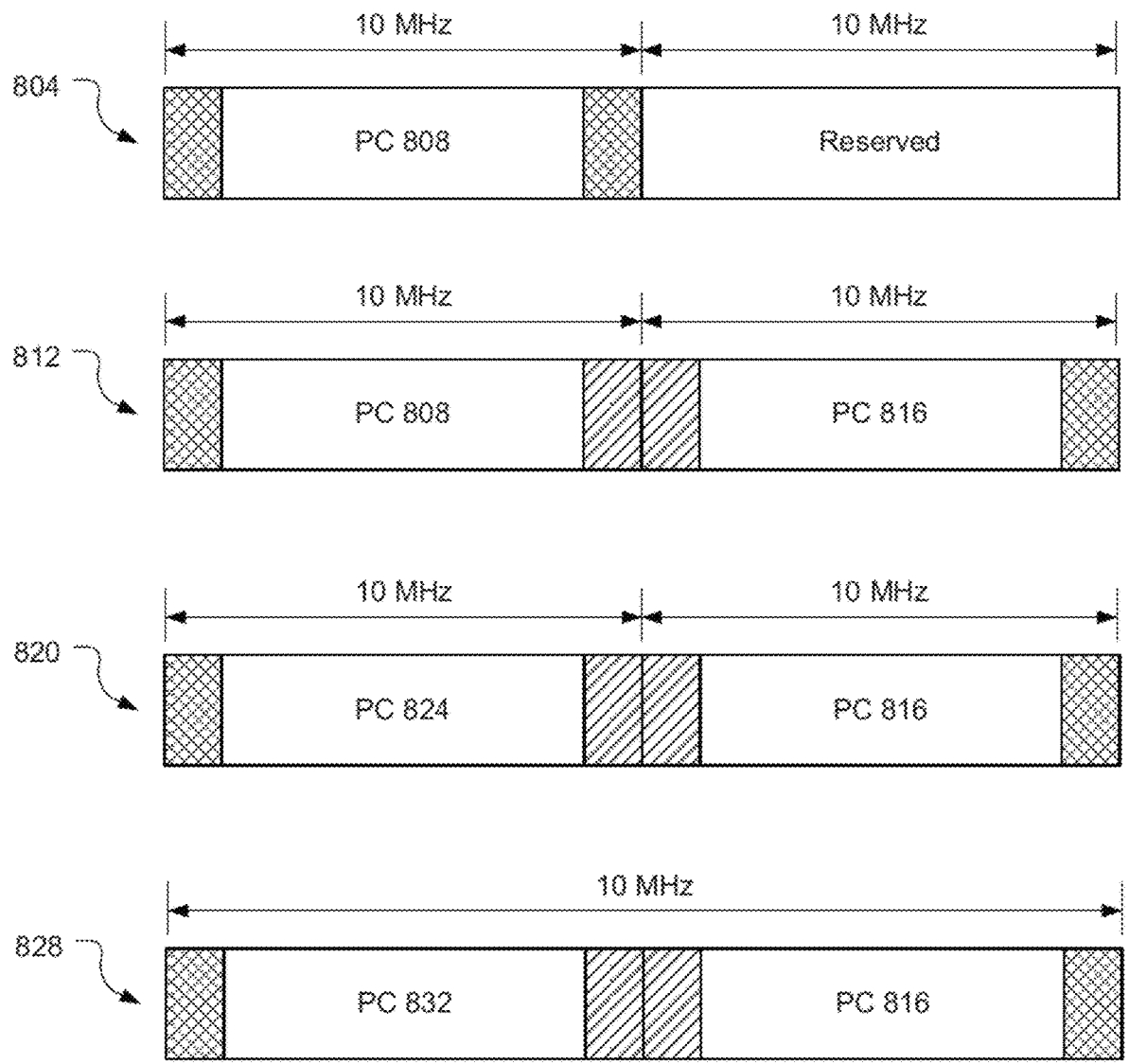
FIG. 8 illustrates how teachings of various embodiments facilitate a flexible deployment and upgrading of network equipment in accordance with some embodiments.

FIG. 8 illustrates how teachings of various embodiments facilitate a flexible deployment and upgrading of network equipment in accordance with various embodiments of this disclosure. At an initial stage 804, 20 MHz of assigned bandwidth may be configured into two 10 MHz bands. The first band may be designated a PC 808 to be used only for communications with legacy terminals. The other 10 MHz band may be reserved.

At deployment stage 812, the formally reserved band may be configured as PC 816 to be used only for communications with VC terminals.

At deployment stage 820, the legacy-only PC 808 may be configured as PC 824 to be used for communications with legacy and/or VC terminals. This stage may be similar to the embodiment discussed with reference to FIG. 6.

At deployment stage 828, the legacy/VC PC 824 may be configured as PC 832 to be used only for communications with VC terminals. In this embodiment, the 20 MHz bandwidth may thus be used as two different 10 MHz bands or one 20 MHz band for various VC terminals of the wireless communication environment.

FIG. 9 illustrates a computing device 900 capable of implementing a VC terminal in accordance with various embodiments. As illustrated, for the embodiments, computing device 900 includes processor 904, memory 908, and bus 912, coupled to each other as shown. Additionally, computing device 900 includes storage 916, and communication interfaces 920, e.g., a wireless network interface card (WNIC), coupled to each other, and the earlier described elements as shown.

Memory 908 and storage 916 may include in particular, temporal and persistent copies of coding and mapping logic 924, respectively. The coding and mapping logic 924 may include instructions that when accessed by the processor 904 result in the computing device 900 performing encoding/decoding and mapping operations described in conjunction with various VC terminals in accordance with embodiments of this disclosure. In particular, these coding and mapping operations may allow a VC terminal, e.g., base station 104 and/or mobile station 108, to transmit and/or receive communications over virtual carriers as described herein.

In various embodiments, the memory 908 may include RAM, dynamic RAM (DRAM), static RAM (SRAM), synchronous DRAM (SDRAM), dual-data rate RAM (DDRRAM), etc.

In various embodiments, the processor 904 may include one or more single-core processors, multiple-core processors, controllers, application-specific integrated circuits (ASICs), etc.

In various embodiments, storage 916 may include integrated and/or peripheral storage devices, such as, but not limited to, disks and associated drives (e.g., magnetic, optical), universal serial bus (USB) storage devices and associated ports, flash memory, read-only memory (ROM), nonvolatile semiconductor devices, etc.

In various embodiments, storage 916 may be a storage resource physically part of the computing device 900 or it may be accessible by, but not necessarily a part of, the computing device 900. For example, the storage 916 may be accessed by the computing device 900 over a network.

In various embodiments, computing device 900 may have more or less components, and/or different architectures.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. This application is intended to cover any adaptations or variations of the embodiments discussed herein. Therefore, it is manifestly intended that embodiments in accordance with the present invention be limited only by the claims and the equivalents thereof.

What is claimed is:

1. One or more non-transitory, computer-readable media having instructions that, when executed, cause a base station to:
   configure a first wireless communication device with a first carrier having first bandwidth for communicating with the base station;
   encode downlink data to be transmitted to the first wireless communication device on subcarriers of the first carrier;
   configure a second wireless communication device with a second carrier having a second bandwidth for communicating with the base station, wherein the second bandwidth is less than the first bandwidth and the second carrier is part of the first carrier, and wherein the first carrier is separated from the second carrier by an amount equal to, or a multiple of, a subcarrier spacing of the first or the second carrier; and
   encode downlink data to be transmitted to the second wireless communication device on subcarriers of the second carrier.

2. The one or more non-transitory, computer-readable media of claim 1, wherein the instructions, when executed, further cause the base station to encode allocation information in the second carrier, the allocation information to indicate, for the first wireless communication device, a location of data in the first carrier.

3. The one or more non-transitory, computer-readable media of claim 1, wherein to encode the downlink data to be transmitted to the first and second wireless communication devices the base station is to generate orthogonal frequency division multiple (OFDM) signals.

4. The one or more non-transitory, computer-readable media of claim 1, wherein each of the first and second bandwidths are a 5, 10, 15, or 20 megahertz bandwidth.

5. One or more non-transitory, computer-readable media having instructions that, when executed, cause a base station to:
   configure a first wireless communication device with a first carrier having first bandwidth for communicating with the base station;
   encode downlink data to be transmitted to the first wireless communication device on subcarriers of the first carrier;
   configure a second wireless communication device with a second carrier having a second bandwidth for communicating with the base station; and
   encode downlink data to be transmitted to the second wireless communication device on subcarriers of the second carrier, wherein the first carrier is separated from the second carrier by an amount equal to, or a multiple of, a subcarrier spacing of the first or the second carrier.

6. The one or more non-transitory, computer-readable media of claim 5, wherein the first and second carriers comprise adjacent frequency ranges.

7. The one or more non-transitory, computer-readable media of claim 5, wherein the instructions, when executed, further cause the base station to:
   utilize all frequency domain samples that correspond to the first and second carriers as one vector input group in an inverse fast Fourier transform.

8. The one or more non-transitory, computer-readable media of claim 5, wherein each of the first and second bandwidths are a 5, 10, 15, or 20 megahertz bandwidth.

9. The one or more non-transitory, computer-readable media of claim 5, wherein the instructions, when executed, further cause the base station to encode allocation information in a third carrier, the allocation information to indicate a location of the downlink data to be transmitted to the first wireless communication device on subcarriers of the first carrier.

10. The one or more non-transitory, computer-readable media of claim 9, wherein the first carrier is reserved for data transmissions and the third carrier is to include control information.

11. A base station comprising:
    means for configuring a first carrier with a first bandwidth and a second carrier with a second bandwidth, wherein the second bandwidth is less than the first bandwidth and the second carrier is part of the first carrier, and wherein the first carrier is separated from the second carrier by an amount equal to, or a multiple of, a subcarrier spacing of the first or the second carrier;
    means for communicating with a first wireless communication device with the first carrier, wherein allocation information is encoded in the second carrier; and
    means for communicating with a second wireless communication device with the second carrier.

12. The base station of claim 11, further comprising means for encoding the allocation information in the second carrier, the allocation information to indicate, for the first wireless communication device, a location of data in the first carrier.

13. The base station of claim 11, wherein each of the first and second bandwidths are a 5, 10, 15, or 20 megahertz bandwidth.

14. A base station comprising:
    means for configuring first and second carriers, wherein the first carrier is separated from the second carrier by an amount equal to, or a multiple of, a subcarrier spacing of the first or the second carrier; and
    means for transmitting control information to a first wireless communication device using the first carrier and transmitting data to a wireless communication device using the second carrier, wherein allocation information is encoded in the second carrier.

15. The base station of claim 14, wherein the first and second carriers comprise adjacent frequency ranges.

16. The base station of claim 14, wherein each of the first and second carriers have a 5, 10, 15, or 20 megahertz bandwidth.

17. The base station of claim 14, wherein said means for transmitting control information comprises:

means for encoding the allocation information to indicate a location of downlink data to be transmitted to the wireless communication device on subcarriers of the second carrier.

* * * * *

UNITED STATES PATENT AND TRADEMARK OFFICE
CERTIFICATE OF CORRECTION

PATENT NO.        : 10,863,506 B2
APPLICATION NO.   : 16/021871
DATED             : December 8, 2020
INVENTOR(S)       : Hujun Yin et al.

Page 1 of 1

It is certified that error appears in the above-identified patent and that said Letters Patent is hereby corrected as shown below:

In the Specification

Column 1, Line 9, delete "Dec. 6, 2016," and insert -- Dec. 1, 2016, --.

Signed and Sealed this
Twenty-fourth Day of August, 2021

Drew Hirshfeld
*Performing the Functions and Duties of the
Under Secretary of Commerce for Intellectual Property and
Director of the United States Patent and Trademark Office*